US010212290B2

(12) United States Patent
Fujino

(10) Patent No.: US 10,212,290 B2
(45) Date of Patent: Feb. 19, 2019

(54) PROFILE GENERATING APPARATUS AND PROFILE GENERATING METHOD

(71) Applicant: SEIKO EPSON CORPORATION, Tokyo (JP)

(72) Inventor: Makoto Fujino, Ngano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/675,847

(22) Filed: Aug. 14, 2017

(65) Prior Publication Data

US 2018/0063340 A1   Mar. 1, 2018

(30) Foreign Application Priority Data

Aug. 26, 2016   (JP) ................. 2016-165377

(51) Int. Cl.
| G01J 3/46 | (2006.01) |
| G01J 3/52 | (2006.01) |
| H04N 1/00 | (2006.01) |
| H04N 1/60 | (2006.01) |

(52) U.S. Cl.
CPC ............ *H04N 1/00045* (2013.01); *G01J 3/46* (2013.01); *G01J 3/462* (2013.01); *G01J 3/52* (2013.01); *H04N 1/6033* (2013.01); *H04N 1/6088* (2013.01); *H04N 1/6097* (2013.01)

(58) Field of Classification Search
CPC .... G01J 3/46; G01J 3/462; G01J 3/52; H04N 1/6033; H04N 1/6097
See application file for complete search history.

(56) References Cited

U.S. PATENT DOCUMENTS

| 6,447,148 | B1* | 9/2002 | Oikawa | F21S 48/1376 |
| | | | | 359/867 |
| 8,537,441 | B2 | 9/2013 | Namikata | |
| 8,593,690 | B2* | 11/2013 | Wurster | G01J 3/46 |
| | | | | 358/1.9 |
| 2008/0130023 | A1* | 6/2008 | Perez | H04N 1/6033 |
| | | | | 358/1.9 |
| 2011/0063618 | A1* | 3/2011 | Horita | G01J 3/46 |
| | | | | 356/402 |
| 2011/0299101 | A1* | 12/2011 | Namikata | H04N 1/6033 |
| | | | | 358/1.9 |

FOREIGN PATENT DOCUMENTS

| JP | 5649337 B2 | 1/2015 |
| WO | 2006/045341 A1 | 5/2006 |

OTHER PUBLICATIONS

The Extended European Search Report for the corresponding European Patent Application No. 17186583.5 dated Dec. 15, 2017.

* cited by examiner

*Primary Examiner* — Shawn Decenzo

(57) ABSTRACT

A profile generating apparatus which generates a profile includes a transmissive color measurement value acquiring portion that acquires a transmissive color measurement value in a case in which light is transmitted to the medium on which a patch is formed, a reflective color measurement value acquiring portion that acquires a reflective color measurement value in a case in which light is reflected from a front surface of the patch, and a profile generating portion that generates the profile based on the transmissive color measurement value and the reflective color measurement value.

7 Claims, 12 Drawing Sheets

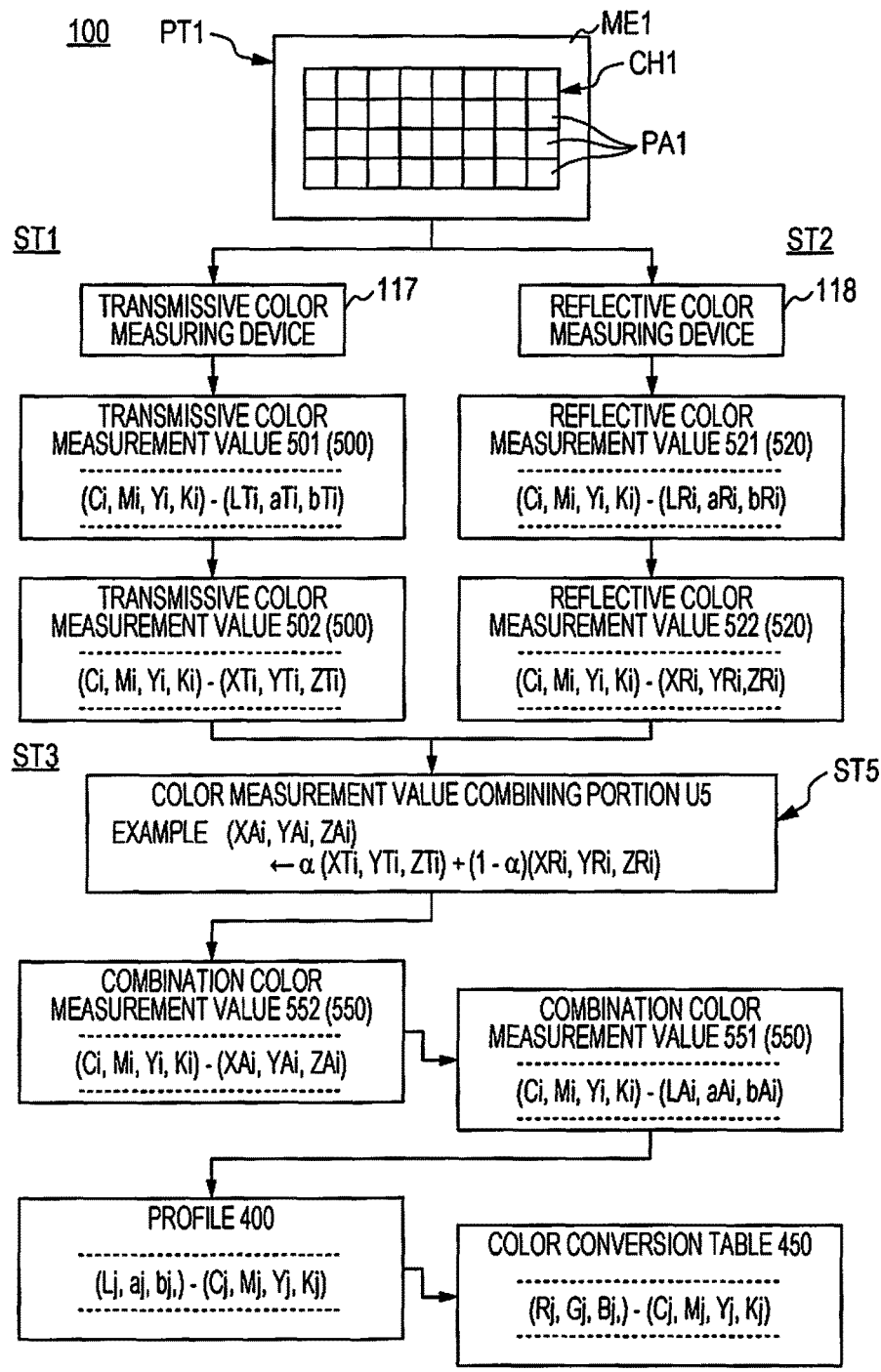

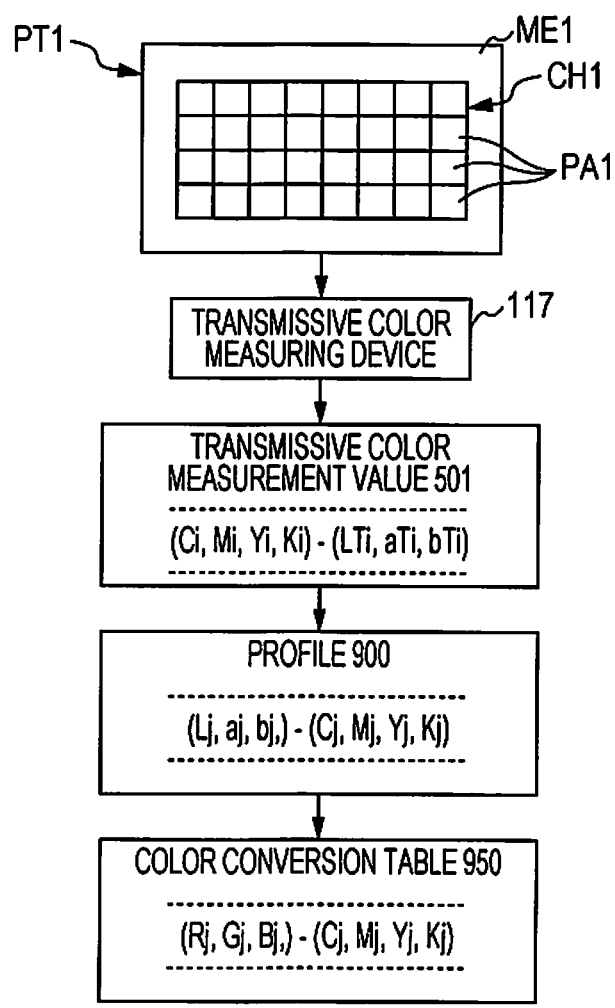

PROFILE GENERATING APPARATUS AND PROFILE GENERATING METHOD

BACKGROUND

1. Technical Field

The present invention relates to a technique of generating a profile in which color reproduction characteristics of an image formed on a medium are regulated.

2. Related Art

For example, signboards using backlights are present at various shopping places (for example, cosmetics shops in airport duty-free shops) in a station. These signboards are formed by, for example, printing an image on a transmissive medium which transmits light. Color of the printed image to be formed on the transmissive medium is designed on the premise of being lighted with the backlights.

Also, as a reference example, a technique of generating an international color consortium (ICC) profile is disclosed in JP-A-2011-254316.

The signboards described above use backlights at night but may not use the backlights in daytime: When seeing the transmissive medium on which the printed image, which is designed on the premise of using the backlights, is formed without the backlights, impression thereof becomes too dark. In addition, even when the backlights are used, illumination on a signboard-seeing side may have an influence on impression of color of the printed image.

Also, problems described above are not limited to the signboards, and also exist in various transmissive media on which an image is formed.

SUMMARY

An advantage of some aspects of the invention is to provide a technique capable of improving color reproduction characteristics of an image on a medium depending on a circumstance of illumination being used.

According to an aspect of the invention, there is provided a profile generating apparatus which generates a profile in which color reproduction characteristics of an image formed on a medium are regulated, the apparatus including a transmissive color measurement value acquiring portion that acquires a transmissive color measurement value which is a color measurement value of a patch in a case in which light is transmitted to the medium on which the patch is formed, a reflective color measurement value acquiring portion that acquires a reflective color measurement value which is a color measurement value of the patch in a case in which light is reflected from a front surface of the patch, and a profile generating portion that generates the profile based on the transmissive color measurement value and the reflective color measurement value.

In addition, according to another aspect of the invention, there is provided a profile generating method of generating a profile in which color reproduction characteristics of an image formed on a medium are regulated, the method including acquiring a transmissive color measurement value which is a color measurement value of a patch in a case in which light is transmitted to the medium on which the patch is formed, acquiring a reflective color measurement value which is a color measurement value of the patch in a case in which light is reflected from a front surface of the patch, and generating the profile based on the transmissive color measurement value and the reflective color measurement value.

Further, according to still another aspect of the invention, there is provided a profile generating apparatus which generates a profile in which color reproduction characteristics of an image formed on a medium are regulated, the apparatus causes a computer to execute a transmissive color measurement value acquiring function of acquiring a transmissive color measurement value which is a color measurement value of a patch in a case in which light is transmitted to the medium on which the patch is formed, a reflective color measurement value acquiring function of acquiring a reflective color measurement value which is a color measurement value of the patch in a case in which light is reflected from a front surface of the patch, and a profile generating function of generating the profile based on the transmissive color measurement value and the reflective color measurement value.

The aspects described above are possible to provide a technique capable of improving color reproduction characteristics of the image on the medium depending on a circumstance of illumination being used.

BRIEF DESCRIPTION OF THE DRAWINGS

The invention will be described with reference to the accompanying drawings, wherein like numbers reference like elements.

FIG. 2 is a diagram schematically illustrating an example of a profile generating method of combining color measurement values.

FIG. 12 is a diagram schematically illustrating an example of a profile generating method of only the transmissive color measurement value.

DESCRIPTION OF EXEMPLARY EMBODIMENTS

Figure 1:
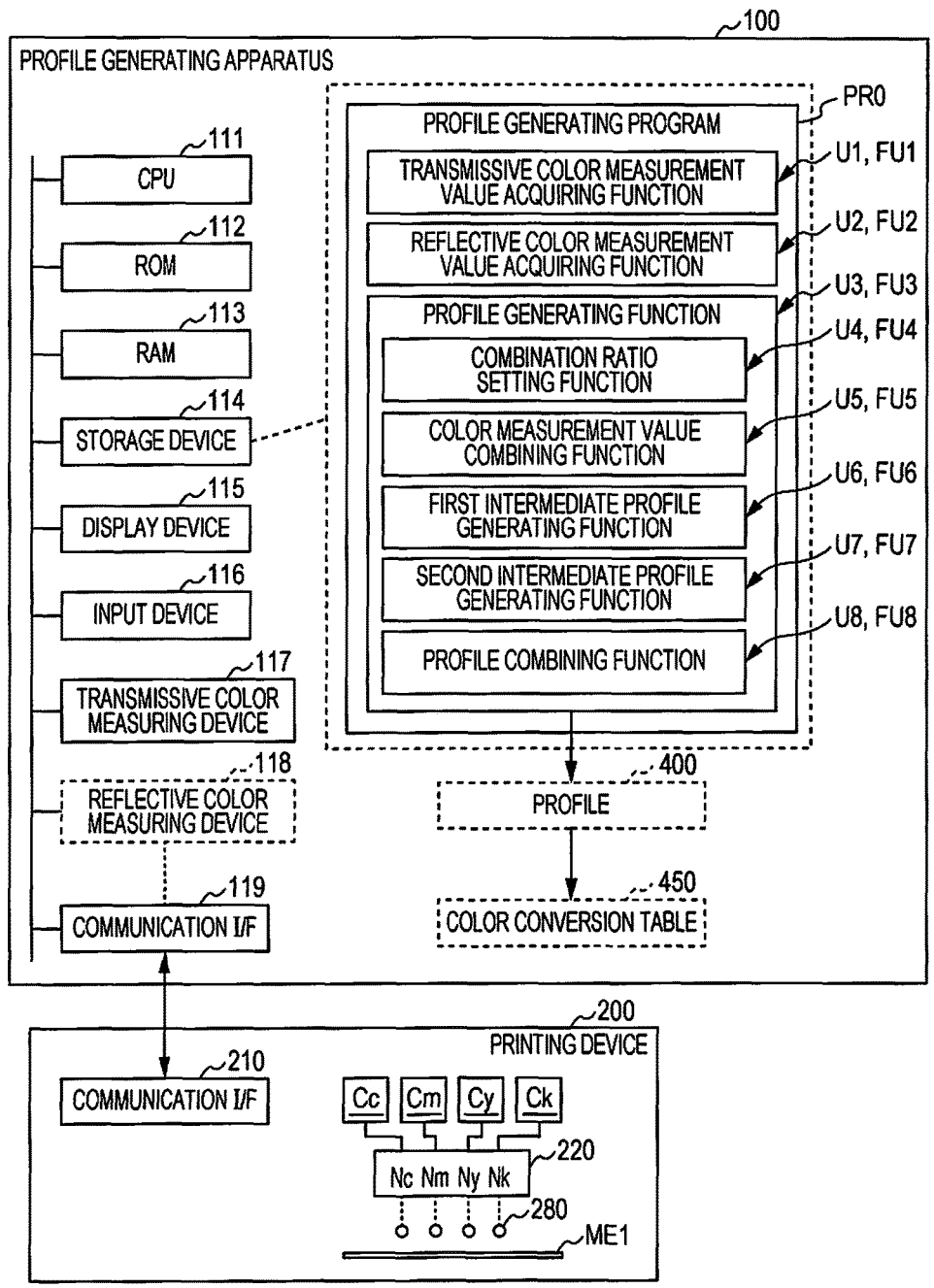
FIG. 1 is a block diagram schematically illustrating a configuration example of a profile generating apparatus.

Hereinafter, embodiments of the invention will be described. Of course, the embodiments as follow are only examples of the invention, and all of features described in the embodiments are not limited to be necessary for solution means of the invention.

1. Outline of Technique

First, an outline of a technique included in the invention will be described with reference to examples illustrated in FIGS. 1 to 12. Also, drawings of this specification are diagrams schematically illustrating the examples, a magnification ratio in a respective direction illustrated in the drawings may be different, and thus the respective drawing may not match with another.

Background

A transmissive medium such as a signboard using backlights is irradiated not only with light due to illumination of backlights, but also by illumination at a front side of the transmissive medium. Therefore, when seeing the transmissive medium, on which the printed image is formed, which is designed on the premise of using the backlights illumination, the medium is affected due to the light from the illumination at the front side of the transmissive medium, and gradation of a dark area of the printed image may be collapsed or hardened (becomes high contrast). For this measure, if it is assumed that trial and error, in which the printed image is observed and the image data is revised (optimized), is performed under an actual illumination circumstance, separate revising is necessary under a circumstance of a circumstance of backlights illumination and a circumstance of illumination at the front side. This technique has an object to reduce such a troublesome, and to improve color reproduction characteristics of the image on the medium depending on a circumstance of illumination being used.

Aspect 1

The profile generating apparatus 100 exemplified in FIGS. 1, 2, 7, 9 and the like is provided with a transmissive color measurement value acquiring portion U1, a reflective color measurement value acquiring portion U2, and a profile generating portion U3, and generates a profile 400 in which color reproduction characteristics of an image IM2 formed on a medium (for example, transmissive medium ME1) are regulated. The transmissive color measurement value acquiring portion U1 acquires a transmissive color measurement value 500 which is a color measurement value of a patch PA1 in a case in which light is transmitted to the medium (ME1) on which the patch PA1 is formed. The reflective color measurement value acquiring portion U2 acquires a reflective color measurement value 520 which is a color measurement value of the patch PA1 in a case in which light is reflected from a front surface PA1a of the patch PA1. The profile generating portion U3 generates the profile 400 based on the transmissive color measurement value 500 and the reflective color measurement value 520.

In Aspect 1 described above, since the profile 400 in which the transmissive color measurement value 500 and the reflective color measurement value 520 are reflected is generated, it is possible to provide a profile generating apparatus which is capable of improving color reproduction characteristics of the image on the medium depending on a circumstance of illumination being used.

Here, the profile includes an ICC profile, a color conversion table, and the like.

The transmissive color measurement value and the reflective color measurement value include values indicating brightness L* and chromaticity coordinates a* and b* in a CIE (international commission on illumination) L*a*b* color space, tristimulus values X, Y, and Z in a CIE XYZ color coordinate system, and the like. Hereinafter, disclosing of "*" will be omitted.

In the generation of the profile based on the transmissive color measurement value and the reflective color measurement value, a profile is generated from a combination color measurement value acquired by combining the transmissive color measurement value and the reflective color measurement value, and a first intermediate profile acquired from the transmissive color measurement value and a second intermediate profile acquired from the reflective color measurement value are combined, and the like.

Aspect 2

However, the profile generating portion U3 may include a color measurement value combining portion U5 generating a combination color measurement value 550 of which the transmissive color measurement value 500 and the reflective color measurement value 520 are combined. The profile generating portion U3 may generate the profile 400 based on the combination color measurement value 550. This aspect is capable of providing an appropriate example of which the color reproduction characteristics of the image on the medium are improved depending on a circumstance of illumination being used.

Aspect 3

Figure 4:
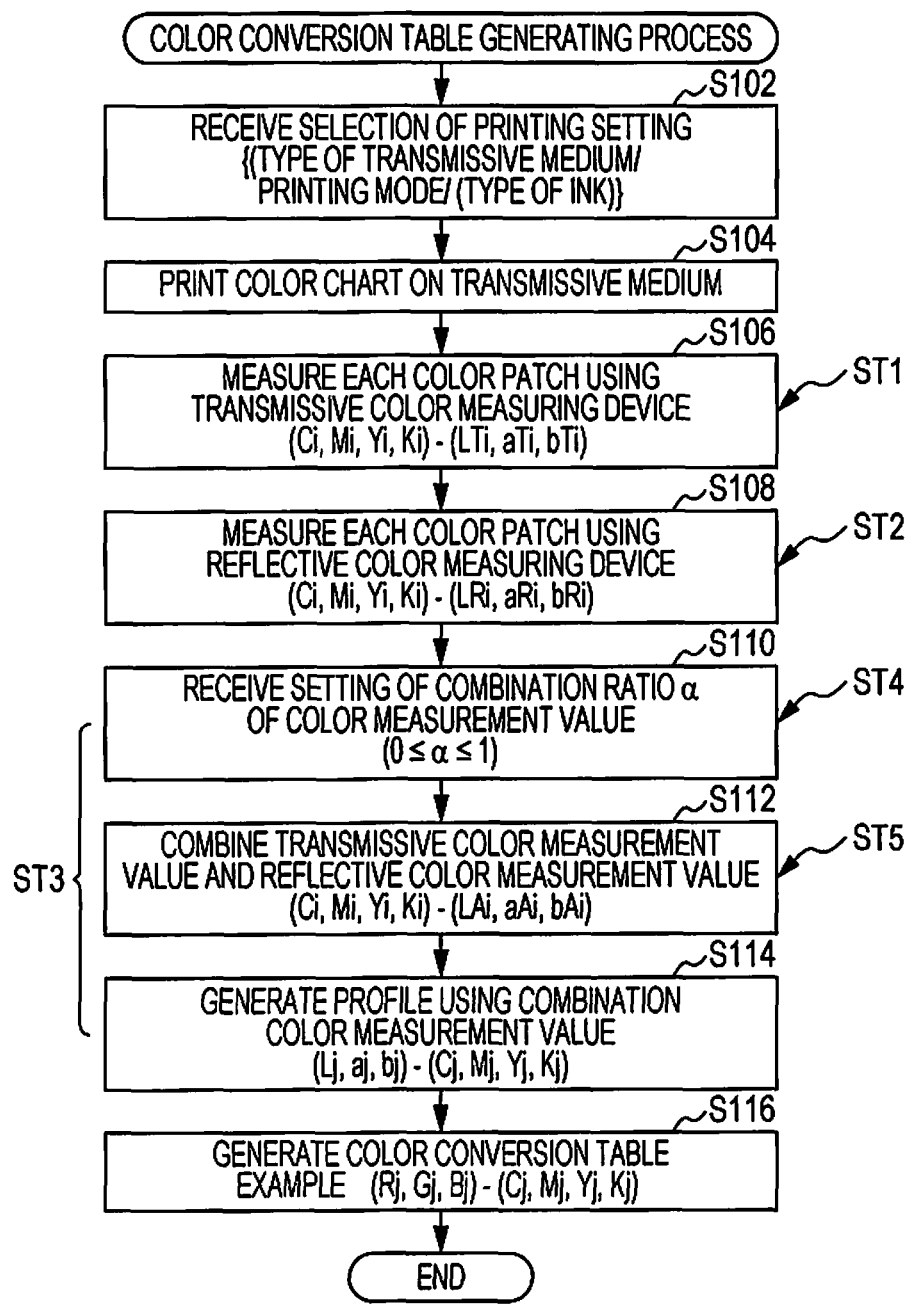
FIG. 4 is a flow chart illustrating an example of a color conversion table generating process.
Figure 5:
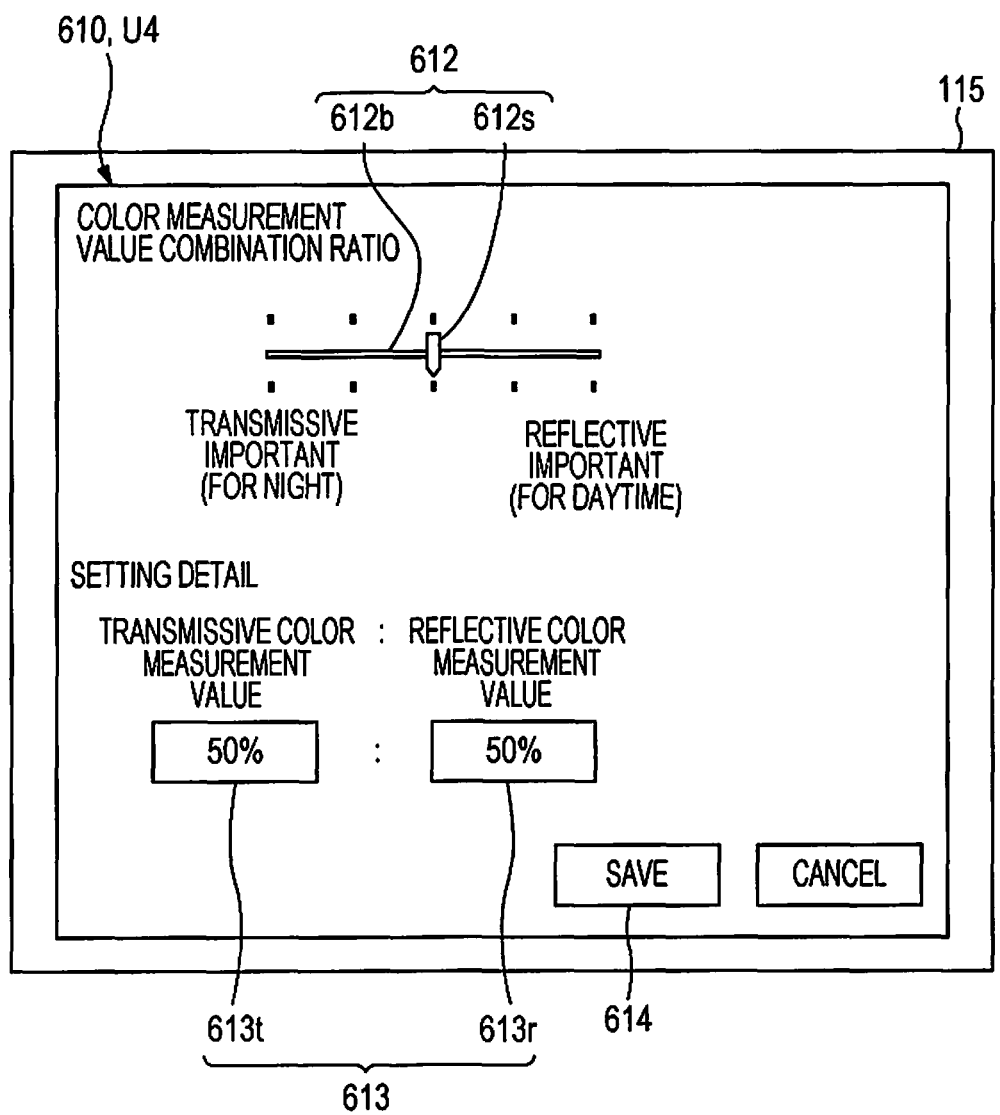
FIG. 5 is a diagram schematically illustrating an example of a combination ratio setting screen.

As illustrated in FIGS. 4, 5, and the like, the profile generating portion U3 may include a combination ratio setting portion U4 which receives setting of a combination ratio (for example, ratio α of transmissive color measurement value 500) of the transmissive color measurement value 500 and the reflective color measurement value 520. The color measurement value combining portion U5 may generate the combination color measurement value 550 by combining the transmissive color measurement value 500 and the reflective color measurement value 520 at a combination ratio (α). This aspect is capable of providing the more appropriate example of which color reproduction characteristics of the image on the medium are improved depending on a circumstance of illumination being used.

Here, if the transmissive color measurement value and the reflective color measurement value are set as a coordinate value of a color coordinate system in which color is quantitatively treated as tristimulus values like X, Y, and Z values (tristimulus values X, Y, and Z in XYZ color coordinate system), it is possible to make the image formed on a medium be with significantly good impression of color.

Aspect 4

Figure 7:
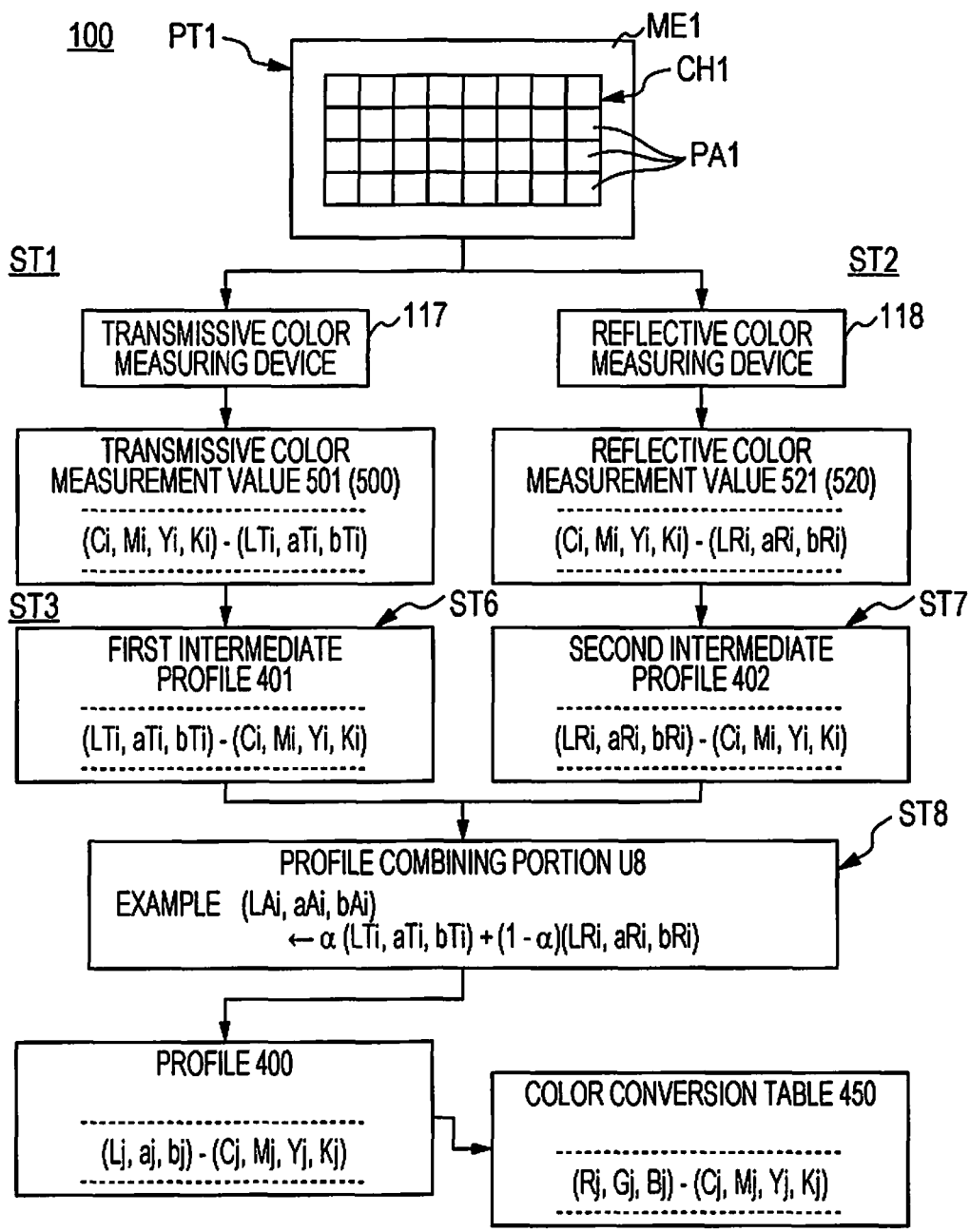
FIG. 7 is a diagram schematically illustrating an example of a profile generating method of combining profiles.
Figure 8:
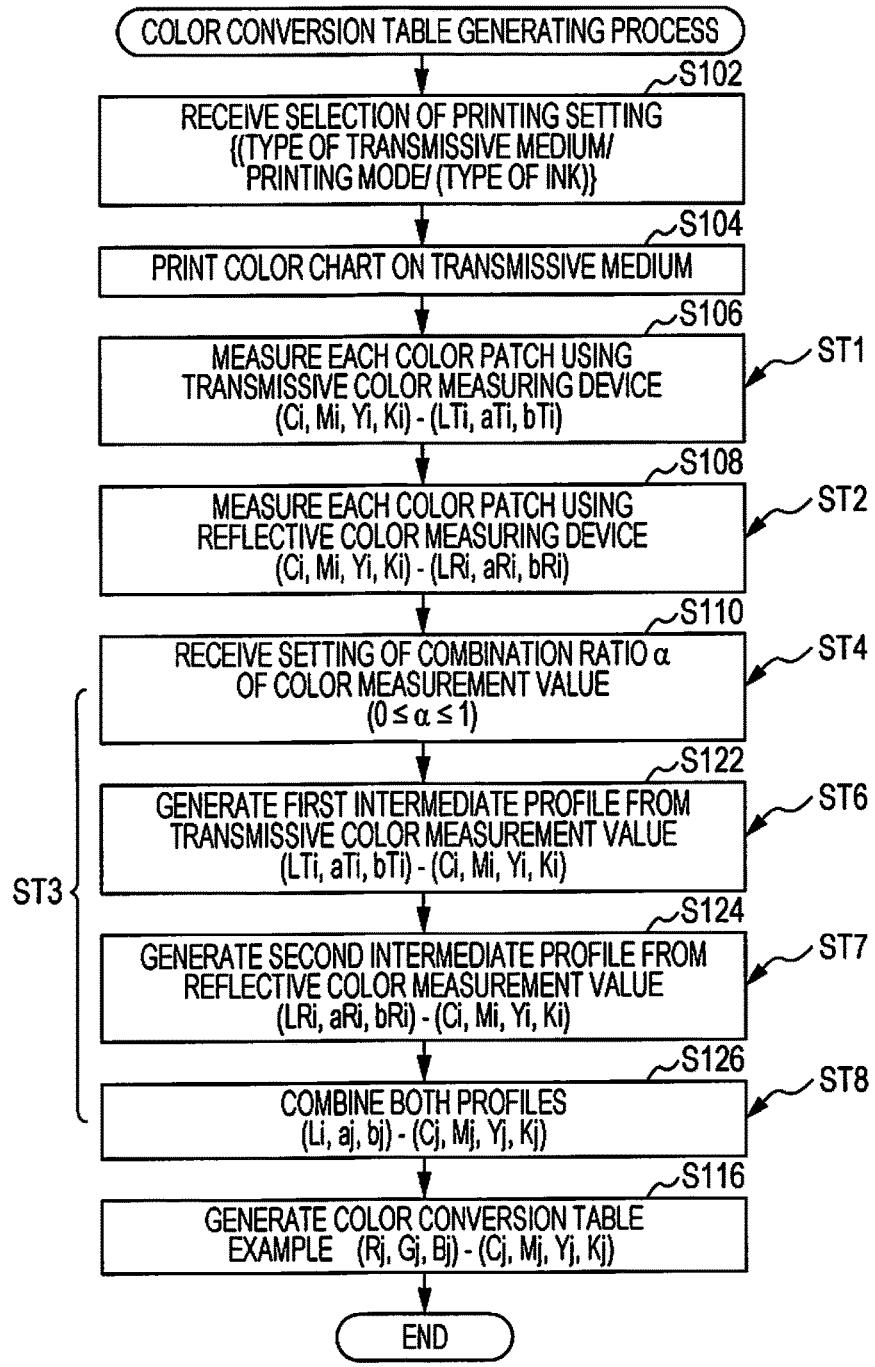
FIG. 8 is a flow chart illustrating an example of the color conversion table generating process.

As illustrated in FIGS. 7 and 8, based on the transmissive color measurement value 500, the profile generating portion U3 may includes a first intermediate profile generating portion U6, which generates a first intermediate profile 401 in which color reproduction characteristics are regulated, in a case in which light is transmitted through the medium (ME1) of an image IM2 to be formed on the medium (ME1). Based on the reflective color measurement value 520, the profile generating portion U3 may include a second intermediate profile generating portion U7 which generates a second intermediate profile 402 in which the color reproduction characteristics are regulated, in a case in which light is reflected from a front surface of the image IM2 formed on the medium (ME1). The profile generating portion U3 may include a profile combining portion U8 which generates the final profile 400 in which the first intermediate profile 401 and the second intermediate profile 402 are combined. This aspect is capable of providing an appropriate example of which color reproduction characteristics of the image on the medium are improved depending on a circumstance of illumination being used.

Aspect 5

As exemplified in FIGS. 5, 8, and the like, the profile generating portion U3 may include the combination ratio setting portion U4 which receives setting of the combination ratio (α) of the transmissive color measurement value 500 and the reflective color measurement value 520. The profile combining portion U8 may combine the first intermediate profile 401 and the second intermediate profile 402 same as a case in which the transmissive color measurement value 500 and the reflective color measurement value 520 are combined at the combination ratio (α). This aspect is capable of providing the more appropriate example of which color reproduction characteristics of the image on the medium are improved depending on a circumstance of illumination being used.

Here, If the transmissive color measurement value and the reflective color measurement value are set as the coordinate value of the color coordinate system in which color is quantitatively treated as tristimulus values like X, Y, and Z values, it is possible to make the image formed on a medium be with significantly good impression of color.

Aspect 6

Figure 9:
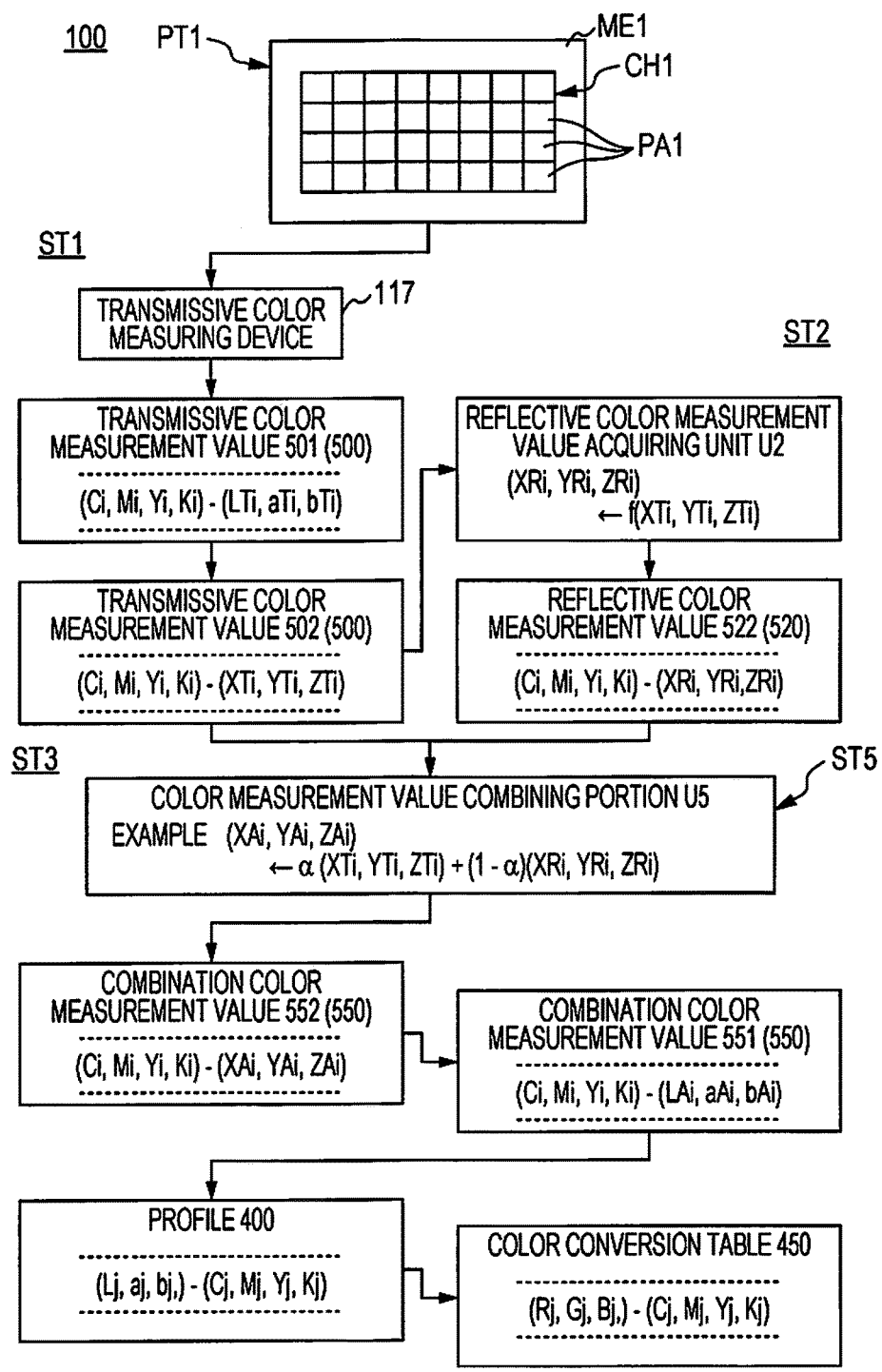
FIG. 9 is a diagram schematically illustrating an example of the profile generating method of estimating a reflective color measurement value.
Figure 10A:
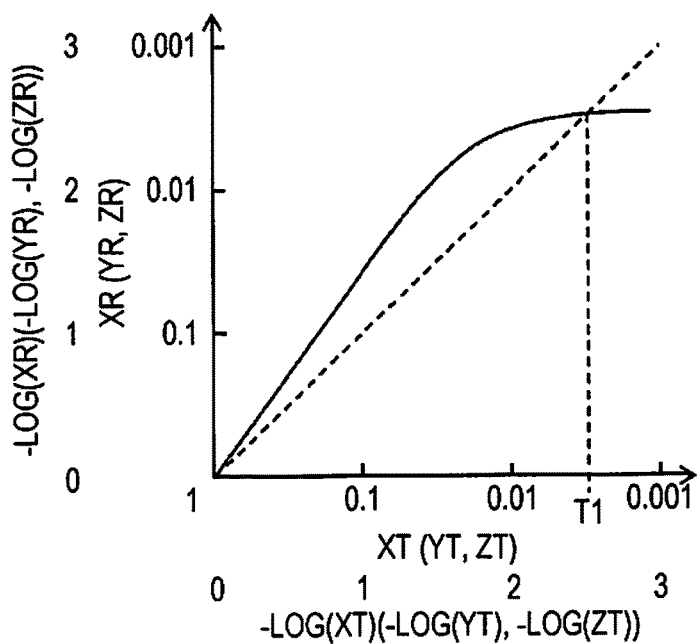
FIG. 10A is a diagram schematically illustrating an example of a correspondence relation between the transmissive color measurement value and the reflective color measurement value.
Figure 11:
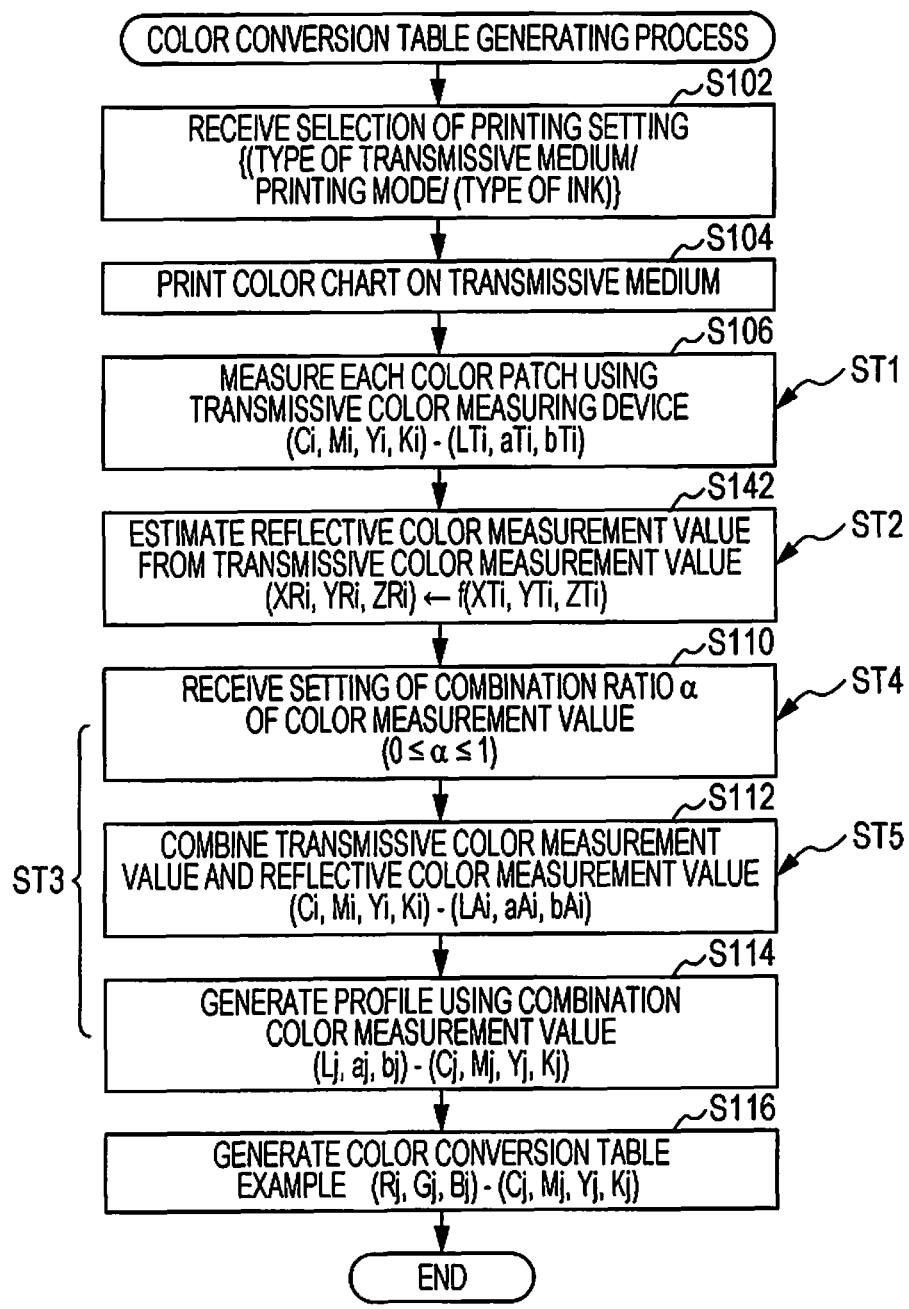
FIG. 11 is a flow chart illustrating an example of the color conversion table generating process.

As exemplified in FIGS. 9 and 11, the reflective color measurement value acquiring portion U2 may acquire the reflective color measurement value 520 being estimated from the transmissive color measurement value 500, in accordance with a correspondence relation (refer to FIG. 10A) between the transmissive color measurement value 500 and the reflective color measurement value 520, which are determined in advance. In this aspect, since the profile 400 can be generated even when there is no color measuring equipment for measuring the patch PA1 in a case in which light is reflected from the front surface PA1a of the patch PA1, it is possible to provide a technique capable of improving convenience.

Aspect 7

As exemplified in FIG. 10A, the correspondence relation may be determined so that reflectance corresponding to the reflective color measurement value 520 is smaller than transmittance corresponding to the transmissive color measurement value 500 in a case in which the transmissive color measurement value 500 is a color measurement value greater than a predetermined transmittance (for example, T1). This aspect is capable of providing an appropriate example of which convenience is improved.

Aspect 8

A profile generating method exemplified in FIGS. 2, 4, 7 to 9, 11, and the like includes a transmissive color measurement value acquiring process ST1 corresponding to the transmissive color measurement value acquiring portion U1, a reflective color measurement value acquiring process ST2 corresponding to the reflective color measurement value acquiring portion U2, and a profile generating process ST3 corresponding to the profile generating portion U3. The aspect is capable of providing a profile generating method in which the color reproduction characteristics of the image on the medium are improved depending on a circumstance of illumination being used. The profile generating method may include a combination ratio setting process ST4 corresponding to the combination ratio setting portion U4, a color measurement value combining process ST5 corresponding to the color measurement value combining portion U5, a first intermediate profile generating process ST6 corresponding to the first intermediate profile generating portion U6, a second intermediate profile generating process ST7 corresponding to the second intermediate profile generating portion U7, and a profile combining process ST8 corresponding to the profile combining portion U8.

Aspect 9

A profile generating program PR0 exemplified in FIGS. 1, 2, 7, 9, and the like causes a computer to execute a transmissive color measurement value acquiring function FU1 corresponding to the transmissive color measurement value acquiring portion U1, a reflective color measurement value acquiring function FU2 corresponding to the reflective color measurement value acquiring portion U2, and a profile generating function FU3 corresponding to the profile generating portion U3. The aspect is capable of providing the profile generating program PR0 in which the color reproduction characteristics of the image on the medium are improved depending on a circumstance of illumination being used. The profile generating program PR0 may cause the computer to execute a combination ratio setting function FU4 corresponding to the combination ratio setting portion U4, a color measurement value combining function FU5 corresponding to the color measurement value combining portion U5, a first intermediate profile generating function FU6 corresponding to the first intermediate profile generating portion U6, a second intermediate profile generating function FU7 corresponding to the second intermediate profile generating portion U7, and a profile combining function FU8 corresponding to the profile combining portion U8.

Further, this technique can be applied to a complex apparatus including a profile generating apparatus, a control method of the profile generating apparatus, a control method of the complex apparatus, a control program of the profile generating apparatus, a control program of the complex apparatus, a medium which can be read by a computer in which the profile generating program or the control program is recorded, and the like. The apparatus described above may be configured with a plurality of parts which are distributed.

2. Specific Example of Profile Generating Apparatus

Figure 6:
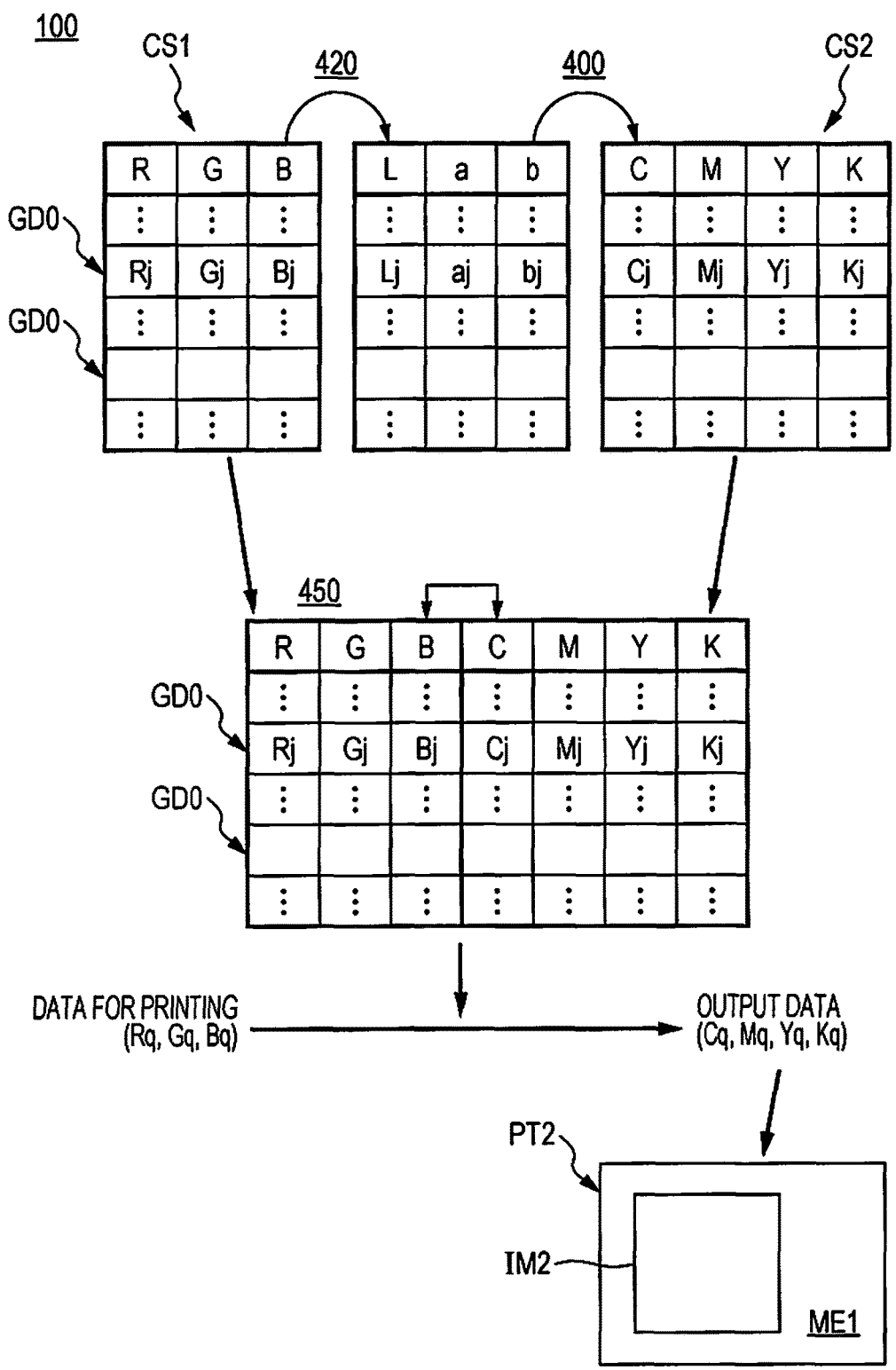
FIG. 6 is a diagram schematically illustrating an example of which a color conversion table is generated.

FIG. 1 schematically illustrates a configuration example of the profile generating apparatus. In the profile generating apparatus 100 illustrated in FIG. 1, a central processing portion (CPU) 111, a read only memory (ROM) 112, a random access memory (RAM) 113, a storage device 114, a display device 115, an input device 116, a transmissive color measuring device 117, a reflective color measuring device 118, a communication interface (I/F) 119, and the like are connected so as to be capable of inputting and outputting information to each other. The profile generating apparatus 100 of this specific example generates the profile 400 as exemplified in FIG. 6, and generates a color conversion table 450. For example, the color conversion table 450 illustrated in FIG. 6 is a lookup table (LUT) in which a correspondence relation between input values ($R_j$, $G_j$, $B_j$) indicating amounts of red, green, and blue (RGB) and output values ($C_j$, $M_j$, $Y_j$, $K_j$) of amounts of ink being used (example of color material) of cyan, magenta, yellow, and black (CMYK) is regulated as each grid point GD0. Here, a variable number j is a variable number which identifies each grid point GD0. The input values ($R_j$, $G_j$, $B_j$) and the output values ($C_j$, $M_j$, $Y_j$, $K_j$) can be represented by, for example, gradation values such as 256 gradations or $2^{16}$ gradations. The number of the grid points GD0 becomes plural so as to satisfy $17^3=4913$ in a case in which RGB is respectively set as 17 stages, and to satisfy $32^3=32768$ in a case in which RGB is respectively set as 32 stages. In a case in which an input color space CS1 is four-dimension, the number of the grid points GD0 further increases.

Also, the grid point means a virtual point disposed at an input color space, and it is assumed that an output coordinate value corresponding to a position of the grid point at the input color space is stored at the grid point. This technique includes that a plurality of the grid points are uniformly disposed inside the input color space, and also the plurality of grid points are not uniformly disposed inside the input color space.

Figure 3A:
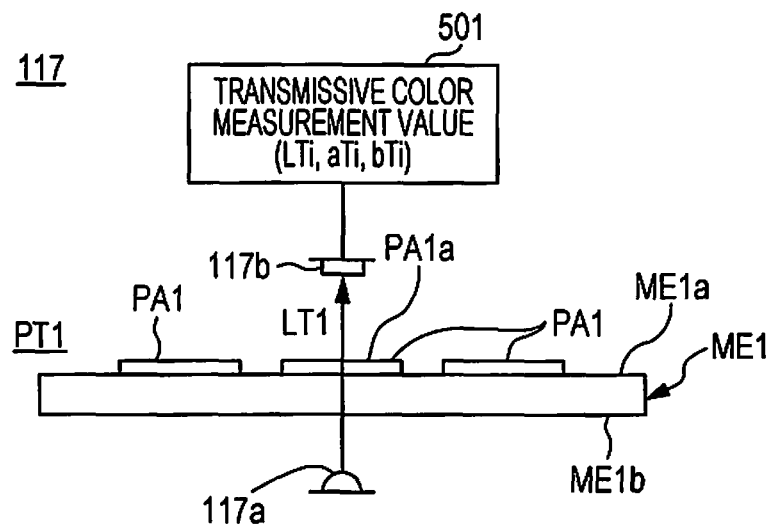
FIG. 3A is a diagram schematically illustrating an example of a transmissive color measuring device.
Figure 3B:
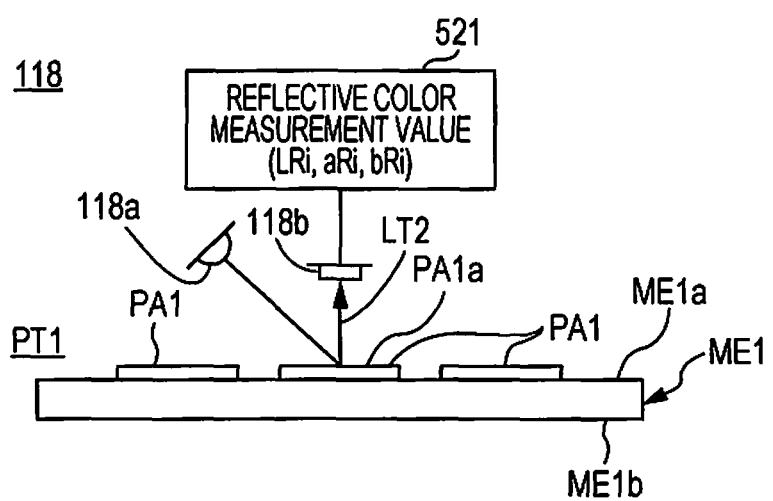
FIG. 3B is a diagram schematically illustrating an example of a reflective color measuring device.

The storage device 114 stores the profile generating program PR0, and the like. As the storage device 114, a nonvolatile semiconductor memory such as a flash memory, a magnetic storage device such as a hard disk or the like can be used. As the display device 115, a liquid crystal display panel or the like can be used. As the input device 116, a point device, a hard key including a keyboard, a touch panel attached to a front surface of a display panel, or the like can be used. Color measuring devices 117 and 118 also illustrated in FIGS. 2, 3A, and 3B are capable of outputting color measurement values 501 and 521 by color-measuring the patch PA1 of each color of a color chart CH1 formed on the transmissive medium ME1 (example of medium). The patch is also referred to as a color chart. The color measurement values are, for example, set to values indicating brightness L and chromaticity coordinates a and b in the CIE Lab color space. The transmissive color measuring device 117 and the reflective color measuring device 118 may be provided to the outside of the profile generating apparatus 100. The profile generating apparatus 100 acquires the color measurement values 501 and 521 from the color measuring devices 117 and 118 and performs various processes. The communication I/F 119 is connected to a communication I/F 210 of a printing device 200, and inputs and outputs information to the printing device 200. As a standard of the communications I/F 119 and 210, a universal serial bus (USB), a short distance wireless communication standard, or the like can be used. Communication of the communications I/F 119 and 210 may be performed in wire or wireless, or through network such as a local area network (LAN) or Internet.

The profile generating program PR0 illustrated in FIG. 1 causes the profile generating apparatus 100 to realize the transmissive color measurement value acquiring function FU1, the reflective color measurement value acquiring function FU2, and the profile generating function FU3. The profile generating function FU3 includes the combination ratio setting function FU4, the color measurement value combining function FU5, the first intermediate profile generating function FU6, the second intermediate profile generating function FU7, and the profile combining function FU8.

Also, the profile generating apparatus 100 includes a personal computer (also includes tablet type terminal) and the like. The profile generating apparatus 100 may include all configuration components 111 to 119 in one case, but may be configured with a plurality of devices which are divided to be capable of communicating with each other. In addition, even when the printing device is the profile generating apparatus 100, this technique can be performed, and the printing device itself having a printing function may perform a profile generating process of this technique.

In the profile generating apparatus 100, a CPU 111 executes a calculation process according to the profile generating program PR0 stored in the storage device 114 or the like using a RAM 113 or the like as a work area, and thus various processes are realized (for example, generating process of profile to be described later).

The printing device 200 illustrated in FIG. 1 is an ink jet printer in which CMYK ink are discharged (ejected) from a recording head 220 and a print image is formed on a print substrate. As the print substrate in this specific example, there is the transmissive medium ME1 which transmits visible light. In the recording head 220, the CMYK ink is respectively supplied from ink cartridges Cc, Cm, Cy, and Ck, and ink droplets 280 of the CMYK are respectively discharged from nozzles Nc, Nm, Ny, and Nk. When the ink droplets 280 are landed to the transmissive medium ME1, ink dots are formed on the transmissive medium ME1. As a result, a print material PT2 including a printed image IM2 exemplified in FIG. 6 is obtained.

The printing device 200 obtains data for printing based on an output image generated by the profile generating apparatus 100, and forms the printed image corresponding to the output image on the transmissive medium based on the data for printing.

3. Profile Generation in First Specific Example

FIG. 2 schematically exemplifies a profile generating method of combining the transmissive color measurement value 500 and the reflective color measurement value 520, as an example of generating the profile 400 using the transmissive color measurement value 500 and the reflective color measurement value 520. FIG. 3A schematically exemplifies an aspect in which the print material PT1 of the color chart CH1 is color-measured by the transmissive color measuring device 117.

A chart CH1 formed on the print material PT1 illustrated in FIGS. 2 and 3A includes the color patch PA1 matched with each grid point GD0 of the color conversion table 450. The transmissive color measuring device 117 acquires the transmissive color measurement value 501 by color-measuring each patch PA1 included in the chart CH1. Here, a variable number for identifying the patch PA1 is set to i, values indicating amounts of the CMYK ink to be used for forming the patch PA1 corresponding to the variable number i are respectively set to Ci, Mi, Yi, and Ki, and Lab values (coordinate values L*, a*, and b* at L*a*b* color space) of the transmissive color measurement value 501 of the patch PA1 corresponding to the variable number i are respectively set to LTi, aTi, and bTi.

The transmissive color measuring device 117 illustrated in FIG. 3A includes a light source 117a disposed at a rear surface ME1b side of the transmissive medium ME1 and a color measuring portion 117b disposed at a front surface ME1a side of the transmissive medium ME1. The light from the light source 117a is transmitted to the print material PT1, and transmitted light LT1 transmitted from the patch PA1 enters to the color measuring portion 117b. If the color measuring portion 117b detects an amount of the measured color of the transmitted light LT1, the transmissive color measuring device 117 outputs the transmissive color measurement values (LTi, aTi, bTi) corresponding to the amount of the measured color. The transmissive color measurement values (LTi, aTi, bTi) are color measurement values of the patch PA1 in a case in which light is transmitted to the transmissive medium ME1 on which the patch PA1 is formed, and are obtained in each patch PA1. Accordingly, collection of the transmissive color measurement values (LTi, aTi, bTi) in each patch PA1 is also referred to as transmission color measuring properties of the image IM2 formed on the transmissive medium ME1.

FIG. 3B is schematically exemplifies an aspect in which the print material PT1 of the color chart CH1 is color-measured by the reflective color measuring device 118. The reflective color measuring device 118 illustrated in FIG. 3B includes the light source 118a disposed on the front surface ME1a side of the transmissive medium ME1, and the color measuring portion 118b. The light from the light source 118a is reflected from the front surface PA1a of the patch PA1, and becomes reflected light LT2 so as to enter to the color measuring portion 118b. If the color measuring portion 118b detects an amount of the measured color of the reflected light LT2, the reflective color measuring device 118 outputs the reflective color measurement values (LRi, aRi, bRi) corresponding to the amount of the measured color. The reflective color measurement values (LRi, aRi, bRi) are the color measurement values of the patch PA1 in a case in which the light is reflected from the front surface PA1a of the patch PA1, and are obtained in each patch PA1. Accordingly, collection of the reflective color measurement values (LRi, aRi, bRi) of each patch PA1 is also referred to as a reflective color measuring property of the image IM2 formed on the transmissive medium ME1.

Also, the color measuring devices 117 and 118 may be an integrated device having both of a function of color-measuring the transmitted light LT1 and a function of color-measuring the reflected light LT2.

However, in a case in which color of the printed image of the transmissive medium such as a signboard using backlights is designed, it is considered that the transmissive medium is assumed to be irradiated with the backlights, the color thereof is measured by applying the light to a rear side of the color patch printed on the transmissive medium, and the profile is generated. FIG. 12 schematically illustrates the profile generating method of only the transmissive color measurement value. In this case, the transmissive color measurement value 501 is acquired by color-measuring each patch PA1 formed in the transmissive medium ME1 using the transmissive color measuring device 117, an ICC profile 900 is generated using the transmissive color measurement value 501, and a color conversion table 950 is generated using the profile 900. When a printed image is formed on the transmissive medium ME1 using the color conversion table 950, if there is no influence of illumination on a front side of the transmissive medium ME1, color reproduction characteristics of the printed image thereof can be significantly great.

However, in actual, the light of the illumination at the front side of the transmissive medium ME1 corresponds to the printed image, and has an influence on impression of color of the printed image. In addition, depending on a user, backlights are used at night but the backlights may be not used in daytime. When seeing the printed image formed on the transmissive medium ME1 using the color conversion table 950 illustrated in FIG. 12 without the backlights, impression thereof becomes too dark. Meanwhile, trial and error in which the printed image is observed and image data is revised under a circumstance of the actual illumination is bothered. In this specific example, it is possible to alleviate such troubles and to easily optimize the impression of color of the printed image according to a usage circumstance of the user.

Next, with reference to FIG. 4, a color conversion table generating process in a first specific example will be described.

FIG. 4 illustrates an example of the color conversion table generating process executed by the profile generating apparatus 100 illustrated in FIG. 1. Here, Step S106 corresponds to the transmissive color measurement value acquiring portion U1, the transmissive color measurement value acquiring process ST1, and the transmissive color measurement value acquiring function FU1. Step S108 corresponds to the reflective color measurement value acquiring portion U2, the reflective color measurement value acquiring process ST2, and the reflective color measurement value acquiring function FU2. Steps S110 to S114 correspond to the profile generating portion U3, the profile generating process ST3, and the profile generating function FU3. Step S110 corresponds to the combination ratio setting portion U4, the combination ratio setting process ST4, and the combination ratio setting function FU4. Step S112 corresponds to the color measurement value combining portion U5, the color measurement value combining process ST5, and the color measurement value combining function FU5. Hereinafter, "Step" is omitted to be disclosed. The profile generating program PR0 of the specific example may not include the functions FU6 to FU8 illustrated in FIG. 1. Also, a processing sequence of each Step S102 to S116 is not limited to a sequence illustrated in FIG. 4.

When the processing starts, the profile generating apparatus 100 receives selection of printing setting which gives an influence on an image quality of the printed image (S102). In the printing setting, there are types or printing modes (for example, printing resolution or recording method) of the transmissive medium, and types of ink and the like may be included. A process of S102 can be a process, for example, of receiving a printing setting of an item selected when the user operates the input device 116 and selects one of a plurality of items of the printing setting.

Continuously, in S104, the color chart CH1 is printed on the transmissive medium ME1. In this process, it is possible that printing data for forming each color patch PA1 to be each value of Ci, Mi, Yi, and Ki indicating amounts of used ink is transmitted to the printing device 200, and the chart CH1 is formed on the transmissive medium ME1. The chart CH1 illustrated in FIG. 2 is formed on the transmissive medium ME1 by the process. The number of the patch PA1 to be formed is not particularly limited, but may be matched with the number of the grid point GD0 of the color conversion table 450 in order to obtain the color measurement values 501 and 521 corresponding to the values Ci, Mi, Yi, and Ki indicating the amount of ink used of the grid point GD0 of the color conversion table 450.

After the color chart is printed, as illustrated in FIG. 3A, the profile generating apparatus 100 color-measures each color patch PA1 using the transmissive color measuring device 117, and acquires the transmissive color measurement value 500 (S106). Accordingly, a correspondence relation between the values Ci, Mi, Yi, and Ki indicating the amount of ink used and the transmissive color measurement values LTi, aTi, and bTi is found in each patch PA1. In the specific example, according to a conversion equation for calculating values of XYZ from values of Lab, the transmissive color measurement values 501 (coordinate values LTi, aTi, bTi) represented by the values of Lab are converted to the transmissive color measurement values 502 (coordinate value XTi, YTi, ZTi) represented by the values of XYZ (coordinate values X, Y, and Z in CIE XYZ color coordinate system), and the combination color measurement values 552 (coordinate values XAi, YAi, ZAi) matching with the reflective color measurement values 522 (coordinate values XRi, YRi, ZRi) represented by the values of XYZ are generated. Also, the transmissive color measurement values 501 and 502 are collectively referred to as the transmissive color measurement value 500, the reflective color measurement values 521 and 522 are collectively referred to as the reflective color measurement value 520, and the combination color measurement values 551 and 552 are collectively referred to as the combination color measurement value 550. The XYZ color coordinate system is a color coordinate system in which color is quantitatively treated using the tristimulus values (stimulus value X or red, stimulus value Y of green, and stimulus value Z of blue) for displaying psychophysical color. Accordingly, when the transmissive color measurement values LTi, aTi, and bTi and the reflective color measurement values XRi, YRi, and ZRi are combined in the XYZ color coordinate system, an image formed in the transmissive medium ME1 can be significantly made with significantly good impression of color.

In addition, as illustrated in FIG. 3B, the profile generating apparatus 100 acquires the reflective color measurement value 520 by color-measuring the patch PA1 of each color using the reflective color measuring device 118 (S108). Accordingly, the correspondence relation between the values Ci, Mi, Yi, and Ki indicating the amount of ink used and the reflective color measurement values LRi, aRi, and bRi is found in each patch PA1. In the specific example, according to the conversion equation for calculating values of XYZ from values of Lab, the reflective color measurement values 521 (coordinate values LRi, aRi, bRi) represented by the values of Lab are converted to the reflective color measurement values 522 (coordinate values XRi, YRi, ZRi), and the combination color measurement values 552 (coordinate values XAi, YAi, ZAi) matching with the transmissive color measurement values 502 (coordinate values XTi, YTi, ZTi) are generated.

After the transmissive color measurement values 502 and the reflective color measurement values 522 represented by the values of XYZ are generated, the profile generating apparatus 100 receives setting of a combination ratio α of the color measurement values 502 and 522 (S110 of FIG. 4). The combination ratio α of the specific example indicates a percentage of the transmissive color measurement value 502, but the combination ratio may be a percentage of the reflective color measurement value 522.

FIG. 5 schematically illustrates an example of a combination ratio setting screen. The combination ratio setting screen 610 illustrated in FIG. 5 includes a slider control 612, a setting detail input field 613, a button 614, and the like.

The slider control 612 is an operation portion for sensibly setting a percentage whether the transmissive color measurement value 502 is important or the reflective color measurement value 522 is important, and is capable of operating the slider 612s to be moved along a slider bar 612b. The slider control 612 illustrated in FIG. 5 is capable of operating setting step by step or continuously from setting (left) in which the transmissive color measurement value 502 (used at night) is important to setting (right) in which the reflective color measurement value 522 (used in daytime) is important. In the setting detail input field 613, a setting value according to a position of the slider 612s may be displayed.

The setting detail input field 613 is an operating portion for inputting the percentage of the transmissive color measurement value 502 and the percentage of the reflective color measurement value 522 as a numeral. For example, on a premise that a total of a percentage being input to a transmissive color measurement value input field 613t and a percentage being input to a reflective color measurement value input field 613r is 100%, an operation of inputting values of 0% to 100% to each of input fields 613t and 613r may be received. Here, a case in which the transmissive color measurement value input field 613t is 100% and the reflective color measurement value input field 613r is 0% means that the reflective color measurement value 522 is not used, and a case in which the transmissive color measurement value input field 613t is 0% and the reflective color measurement value input field 613r is 100% means that the transmissive color measurement value 502 is not used. Of course, on a premise that both of the color measurement values 502 and 522 are combined, for example, an operation of inputting the values of 1% to 99% to each of input fields 613t and 613r may be received.

The profile generating apparatus 100 stores the combination ratio α in accordance with the operation received in the slider control 612 or an input field 613 when receiving operation of a storage button 614 by the input device 116, and a procedure goes to S112 of FIG. 4.

Also, the combination ratio setting screen may not include any one of the slider control 612 and the setting detail input field 613.

After the combination ratio α is set, the profile generating apparatus 100 generates the combination color measurement values 552 (coordinate values XAi, YAi, ZAi) in each patch PA1 using the transmissive color measurement values 502 (coordinate values XTi, YTi, ZTi) and the reflective color measurement values 522 (coordinate values XRi, YRi, ZRi) (S112). The combination color measurement values XAi, YAi, and ZAi can be calculated by equations as follows.

With equations of $XAi=\alpha \cdot XTi+(1-\alpha) \cdot XRi$ ... (1), $YAi=\alpha \cdot YTi+(1-\alpha) \cdot YRi$ ... (2), and $ZAi=\alpha \cdot ZTi+(1-\alpha) \cdot ZRi$ ... (3), the correspondence relation between the values Ci, Mi, Yi, and Ki indicating the amount of ink used and the combination color measurement values XAi, YAi, and ZAi is found in each patch PA1. In the specific example, according to a conversion equation in which the values of Lab are calculated from the values of XYZ, the combination color measurement values 552 (coordinate values XAi, YAi, ZAi) represented by the values of XYZ are converted to the combination color measurement values 551 (coordinate values LAi, aAi, bAi) represented by the values of Lab. That is, the correspondence relation between the values Ci, Mi, Yi, and Ki indicating the amounts of ink used and the combination color measurement values LAi, aAi, and bAi is found in each patch PA1.

After the combination color measurement values 551 are generated, the profile generating apparatus 100 generates the profile 400 (for example, ICC profile) using the combination color measurement values 551 (coordinate value LAi, aAi, bAi) (S114). For example, as illustrated in FIG. 6, the profile 400 is set to LUT in which a correspondence relation between values of Lab Lj, aj, and bj and the values Cj, Mj, Yj, and Kj indicating the amount of ink used is regulated. Since the combination color measurement values LAi, aAi, and bAi corresponding to the values Ci, Mi, Yi, and Ki indicating the amount of ink used is found in each patch PA1, the combination color measurement values LAi, aAi, and bAi are stored in the profile 400 as the values of Lab Lj, aj, and bj, and the values Ci, Mi, Yi, and Ki indicating the amount of ink used are stored in the profile 400 as the values Cj, Mj, Yj, and Kj. Accordingly, the profile 400 is generated in which the correspondence relation between the values of Lab Lj, aj, bj and the values Cj, Mj, Yj, and Kj indicating the amount of ink used is regulated. Also, since the combination color measurement values 551 are generated using the transmissive color measurement values 500 and the reflective color measurement values 520, the profile 400 is generated on the basis of the transmissive color measurement values 500 and the reflective color measurement values 520.

After the profile 400 is generated, the profile generating apparatus 100 generates the color conversion table 450 using the profile 400 illustrated in FIG. 6 (S116 of FIG. 4), and finishes the color conversion table generating process. The color conversion table 450 illustrated in FIG. 6 can be generated using, for example, an input profile 420 indicating color characteristics of an input device (for example, external display device) and the profile 400 described above. The input profile 420 illustrated in FIG. 6 is information indicating a correspondence relation between coordinate values (Rj, Gj, Bj) of a RGB color space (input color space CS1) and coordinate values (Lj, aj, bj) of a Lab color space present in the input device. The coordinate values (Rj, Gj, Bj) indicate amounts of color of RGB. The profile 400 illustrated in FIG. 6 is information indicating a correspondence relation between the coordinate values (Cj, Mj, Yj, Kj) of CMYK color space (output color space CS2) and the coordinate values (Lj, aj, bj) of the Lab color space present in an output device. The coordinate values (Cj, Mj, Yj, Kj) indicate an amount of used of CMYK ink. Also, the variable number j is a variable number identifying each grid point GD0 corresponding to a coordinate of the input color space CS1. The coordinate values (Lj, aj, bj) of the Lab color space corresponding to the input coordinate values (Rj, Gj, Bj) indicating a position of each grid point GD0 can be acquired from the input profile 420. The coordinate values (Cj, Mj, Yj, Kj) of output color space CS2 corresponding to each of the coordinate values (Lj, aj, bj) of the Lab color space can be acquired from the profile 400. As illustrated in FIG. 6, if the input coordinate values (Rj, Gj, Bj) and the output coordinate values (Cj, Mj, Yj, Kj) correspond to each other, the color conversion table 450 in which the correspondence relation relating to each grid point GD0 is regulated can be generated.

The generated color conversion table 450 is embedded in, for example, a printer driver which is not illustrated. A printing control device realized by the printer device generates output data indicating coordinate values (Cq, Mq, Yq, Kq) of the output color space CS2 from data for printing indicating coordinate values (Rq, Gq, Bq) of the input color space CS1 with reference to the color conversion table 450. If the output data is transmitted to the printing device 200, the printing device 200 prints the image IM2 on the transmissive medium ME1 based on the output data so as to form the print material PT2.

As described above, in this specific example, since the transmissive color measurement value 500 and the reflective color measurement value 520 are combined at the combination ratio α of setting of a user so that the profile 400 is generated on the basis of the combination color measurement value 550, the transmissive color measurement value 500 and the reflective color measurement value 520 are reflected in the obtained profile 400 at a percentage of user's preference. Accordingly, in this example, it is possible that gradation of a dark area of the image on the medium is not collapsed or not hardened under a circumstance that the transmitted light and the reflected light are coexist, and color reproduction characteristics of the image on the medium can be improved depending on a circumstance of illumination being used by a user.

Also, the transmissive color measurement value and the reflective color measurement value are preferably combined as the values of XYZ from a point of quantitatively treating color with the tristimulus values, and may be combined as the values of Lab and the like. For example, the combination color measurement values 551 (coordinate values LAi, aAi, bAi) can be also generated according to equations as follows from the transmissive color measurement values 501 (coordinate values LTi, aTi, bTi) and the reflective color measurement values 521 (coordinate values LRi, aRi, bRi).

$$LAi = \alpha \cdot LTi + (1-\alpha) \cdot LRi \quad (4)$$

$$aAi = \alpha \cdot aTi + (1-\alpha) \cdot aRi \quad (5)$$

$$bAi = \alpha \cdot bTi + (1-\alpha) \cdot bRi \quad (6)$$

4. Profile Generation in Second Specific Example

FIG. 7 schematically exemplifies the profile generating method of combining the first intermediate profile 401 obtained from the transmissive color measurement value 500 and the second intermediate profile 402 obtained from the reflective color measurement value 520 as an example of generating the profile 400 using both the color measurement values 500 and 520. FIG. 8 illustrates an example of the color conversion table generating process being executed by the profile generating apparatus 100 illustrated in FIG. 1. In the color conversion table generating process illustrated in FIG. 8, S112 to S114 in the color conversion table generating process illustrated in FIG. 4 are replaced with S122 to S126. Here, S110, S122 to S126 correspond to the profile generating portion U3, the profile generating process ST3, and the profile generating function FU3. S122 corresponds to the first intermediate profile generating portion U6, the first intermediate profile generating process ST6, and the first intermediate profile generating function FU6. S124 corresponds to the second intermediate profile generating portion U7, the second intermediate profile generating process ST7, and the second intermediate profile generating function FU7. S126 corresponds to the profile combining portion U8, the profile combining process ST8, and the profile combining function FU8. The profile generating program PR0 of the specific example may not include the color measurement value combining function FU5 illustrated in FIG. 1. Also, a processing sequence of each of Steps S102 to S110, and S122 to S126, and S116 is not limited to a processing sequence illustrated in FIG. 8.

When the process starts, the profile generating apparatus 100 receives selection of the printing setting, prints the color chart CH1 on the transmissive medium ME1, acquires the transmissive color measurement value 501 and the reflective color measurement value 521, and receives setting of the combination ratio α through a combination ratio setting screen illustrated in FIG. 5 (S102 to S110). Then, the profile generating apparatus 100 generates a first intermediate profile 401 (for example, ICC profile) in which color reproduction characteristics are regulated in a case in which light is transmitted to the transmissive medium ME1 of the printed image IM2 formed on the transmissive medium ME1 (S122). The first intermediate profile 401 can be generated by regulating the correspondence relation between the values of Lab LTi, aTi, and bTi using the transmissive color measurement values 501 (coordinate values LTi, aTi, bTi) of each patch PA1 and the values Ci, Mi, Yi, and Ki indicating the amounts of ink used.

In addition, the profile generating apparatus 100 generates the second intermediate profile 402 (for example, ICC profile) in which the color reproduction characteristics are regulated, in a case in which light is reflected from a front surface of the printed image IM2 formed on the transmissive medium ME1 (S124). The second intermediate profile 402 can be generated by regulating the correspondence relation between the values of Lab LRi, aRi, and bRi using the reflective color measurement values 521 (coordinate values LRi, aRi, bRi) of each patch PA1 and the values Ci, Mi, Yi, and Ki indicating the amounts of ink used.

After intermediate profiles 401 and 402 are generated, the profile generating apparatus 100 generates the final profile 400 (refer to FIG. 6) by combining both the intermediate profiles 401 and 402 so that the transmissive color measurement value 500 and the reflective color measurement value 520 are combined at the combination ratio α (S126). For example, a case is considered in which the combination color measurement values corresponding to the values Ci, Mi, Yi, and Ki indicating the amount of ink used are set to the values of Lab LAi, aAi, and bAi, and the transmissive color measurement values 501 (coordinate values LTi, aTi, bTi) and the reflective color measurement values 521 (coordinate values LRi, aRi, bRi) are combined at the combination ratio α. In this case, according to Equations (4) to (6) described above, the combination color measurement values 551 (coordinate values LAi, aAi, bAi) may be calculated, the combination color measurement values LAi, aAi, and bAi may be stored in the profile 400 as the values of Lab Lj, aj, and bj, and the values Ci, Mi, Yi, and Ki indicating the amount of ink used may be stored in the profile 400 as the values Cj, Mj, Yj, and Kj.

In addition, the color measurement values 501 and 521 may be converted to the values of XYZ from the values of Lab, the transmissive color measurement values 502 (coordinate values XTi, YTi, ZTi) and the reflective color measurement values 522 (coordinate values XRi, YRi, ZRi) may be combined at the combination ratio α, the obtained combination color measurement values 552 (coordinate values XAi, YAi, ZAi) may be converted to the values of Lab from the values of XYZ, and the obtained combination color measurement values LAi, aAi, and bAi may be stored in the profile 400 as the values of Lab Lj, aj, and bj.

After the profile 400 is generated, the profile generating apparatus 100 generates the color conversion table 450 illustrated in FIG. 6 using the profile 400 (S116 of FIG. 8), and finishes the color conversion table generating process.

As described above, in this example, since the profile 400 is generated so that the transmissive color measurement value 500 and the reflective color measurement value 520 are combined at the combination ratio α of the setting of the user, in the obtained profile 400, the transmissive color measurement value 500 and the reflective color measurement value 520 are reflected at a percentage of user's preference. Accordingly, also in the specific example, color reproduction characteristics of the image on the medium are improved depending on a circumstance of illumination being used by a user.

5. Profile Generation in Third Specific Example

Depending on the user, the reflective color measuring device 118 may not provided, or the transmissive color measuring device 117 may not provided. In this case, it is preferable that the reflective color measurement value 520 can be estimated from the transmissive color measurement value 500.

Figure 10B:
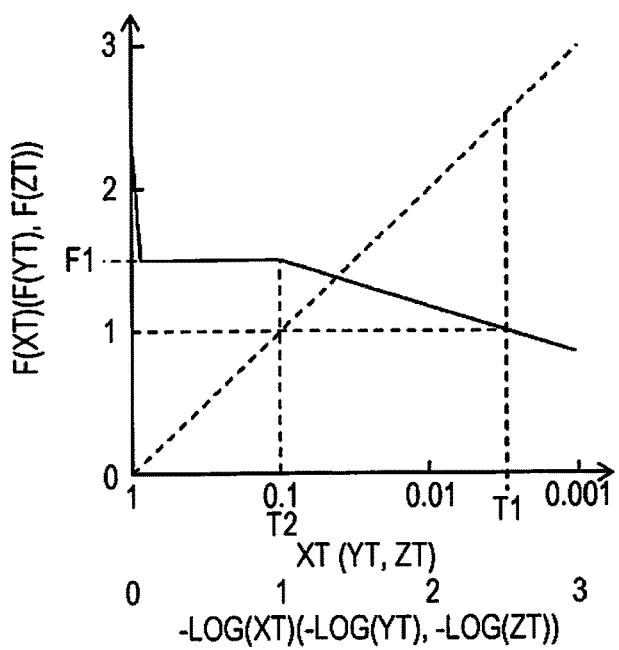
FIG. 10B is a diagram schematically illustrating an example of a coefficient according to the transmissive color measurement value.

FIG. 9 schematically exemplifies the profile generating method of estimating the reflective color measurement value 520 from the transmissive color measurement value 500 as an example of generating the transmissive color measurement value 500 and the profile 400 using the reflective color measurement value 520. FIG. 10A schematically exemplifies the correspondence relation between the transmissive color measurement value 500 and the reflective color measurement value 520. FIG. 10B schematically exemplifies a coefficient in accordance with the transmissive color measurement value 500. First, with reference to FIGS. 9, 10A, and 10B, an example of calculating the reflective color measurement value 520 estimated from the transmissive color measurement value 500 will be described.

A color chart is formed on a representative type of the transmissive medium with a representative type of ink, the transmissive color measurement value 501 and the reflective color measurement value 521 represented by the values of Lab are acquired, and the values are converted to the transmissive color measurement values 502 (coordinate values XTi, YTi, ZTi) and the reflective color measurement values 522 (coordinate values XRi, YRi, ZRi) represented by the values of XYZ. FIG. 10A schematically exemplifies a correspondence relation when points (XTi and XRi) in each patch PA1 are plotted on an XT-XR plane in which an XT axis relatively indicating an X component of the transmissive color measurement value 502 and an XR axis relatively indicating the X component of the reflective color measurement value 522 are formed. Also, the XT axis and the XR axis are logarithmic axes, an XT value represented by the XT axis and an XR value represented by the XR axis are relative values when the maximum amount of the X component of the XYZ color coordinate system is 1. In addition, a common logarithm in which 10 is base as LOG, values of –LOG(XT) and –LOG(XR) are also illustrated. a correspondence relation when points (YTi, YRi) in each patch PA1 are plotted on a YT-YR plane configured with a YT axis relatively indicating a Y component of the transmissive color measurement value 502 and a YR axis relatively indicating a Y component of the reflective color measurement value 522, and the correspondence relation when points (ZTi, ZRi) in each patch PA1 are plotted on a ZT-ZR plane configured with a ZT axis relatively indicating a Z component of the transmissive color measurement value 502 and a ZR axis relatively indicating a Z component of the reflective color measurement value 522, are the same so as to be collectively illustrated.

As illustrated in FIG. 10A, in a case in which the XT value indicating the transmissive color measurement value is greater than a certain transmittance T1, the XR value indicating the reflective color measurement value is smaller than the XT value. When seeing a correspondence relation between a value of –LOG(XT) and a value of –LOG(XR), the value of –LOG(XR) linearly increases with an inclination greater than 1 starting from an origin point 0, inclination near exceed 2 is convex upward so as to draw a curve, and is intersecting with a straight line –LOG(XR)=–LOG(XT) in XT=T1. The Y component and the Z component are also same as above.

Here, coefficients F(XT), F(YT), and F(ZT) are defined as follows.

$$F(XT) = \{-LOG(XR)\}/\{-LOG(XT)\} \quad (7)$$

$$F(YT) = \{-LOG(YR)\}/\{-LOG(YT)\} \quad (8)$$

$$F(ZT) = \{-LOG(ZR)\}/\{-LOG(ZT)\} \quad (9)$$

FIG. 10B illustrates a relation between the XT value indicating the transmissive color measurement value and the coefficient F(XT). In addition, the value of –LOG(XT) is also illustrated. The Y component and the Z component are the same as above so as to be illustrated collectively.

As illustrated in FIG. 10B, in a case in which the XT value indicating the transmissive color measurement value is equal to or more than a certain transmittance T2, the coefficient F(XT) is approximately the constant number F1. However, 1>T2>T1 (for example, T2=0.1), and 1<F1<2. In a case in which the XT value is smaller than the transmittance T2, the coefficient F(XT) is approximately a decreasing function which decreases as the value of –LOG(XT) becomes larger (if incline is set to ΔF, –1<ΔF<0). The Y component and the Z component are also same as above.

The XR value, the YR value, and the ZR value indicating the reflective color measurement values can be calculated from the XT value, a YT value, and a ZT value indicating the transmissive color measurement value using the coefficients F(XT), F(YT), and F(ZT) described above. First, the above-described Equations (7) to (9) can be modified as follows.

$$LOG(XR)=F(XT)\cdot LOG(XT) \quad (10)$$

$$LOG(YR)=F(YT)\cdot LOG(YT) \quad (11)$$

$$LOG(ZR)=F(ZT)\cdot LOG(ZT) \quad (12)$$

Accordingly, the XR value, the YR value, and the ZR value can be obtained by equations as follows.

$$XR=10^{F(XT)\cdot LOG(XT)} \quad (13)$$

$$YR=10^{F(YT)\cdot LOG(YT)} \quad (14)$$

$$ZR=10^{F(ZT)\cdot LOG(ZT)} \quad (15)$$

A correspondence relation between the XT value, the YT value, and a ZT value indicating the transmissive color measurement values and an XR value, a YR value, and a ZR value indicating the reflective color measurement values may be varied from a correspondence relation illustrated in FIGS. 10A and 10B according to the types of the transmissive medium or the types of ink. However, qualitatively, in a case in which the XT value, the YT value, and the ZT value are greater than a certain transmittance (transmittance T1 of FIG. 10A), XR<XT, YR<YT, and ZR<ZT are satisfied. Accordingly, the correspondence relation between the transmissive color measurement value 502 and the reflective color measurement value 522 is determined so that the reflective color measurement value 522 (for example, XR, YR, and ZR) is determined to be smaller than the transmissive color measurement value 502 (for example, XT, YT, and ZT), in a case in which a color measurement value in which the transmissive color measurement value 502 is greater than a predetermined transmittance (for example, T1).

In addition, in a case in which the transmissive color measurement value 502 is equal to or less than a predetermined transmittance (for example, T2), the correspondence relation between the color measurement values 502 and 522 is determined to satisfy Equations (13) to (15) using the coefficients F(XT), F(YT), and F(ZT) which are a constant number greater than 1 and smaller than 2.

FIG. 11 illustrates an example of a color conversion table generating process executed by the profile generating apparatus 100 illustrated in FIG. 1. In the color conversion table generating process illustrated in FIG. 11, S108 in the color conversion table generating process illustrated in FIG. 4 is replaced with S142. Here, S142 corresponds to the reflective color measurement value acquiring portion U2, the reflective color measurement value acquiring process ST2, and the reflective color measurement value acquiring function FU2. The profile generating program PR0 of the specific example may not have the functions FU6 to FU8 illustrated in FIG. 1. Also, a processing sequence of each of Steps S102 to S106, S142, S110 to S116 is not limited to a sequence illustrated in FIG. 11.

When the process starts, the profile generating apparatus 100 receives selection of the printing setting, prints the color chart CH1 on the transmissive medium ME1, and acquires the transmissive color measurement values 501 and 502 (S102 to S106). Then, the profile generating apparatus 100 acquires the reflective color measurement value 520 being estimated from the transmissive color measurement value 500 according to the correspondence relation between the transmissive color measurement value 500 and the reflective color measurement value 520 determined in advance (S142). In a case in which the transmissive color measurement values 502 (coordinate values XTi, YTi, ZTi) illustrated in FIG. 9 is acquired, the reflective color measurement values 522 (coordinate values XRi, YRi, ZRi) being estimated in accordance with Equations (13) to (15) described above may be calculated in each patch PA1.

After the reflective color measurement value 522 is acquired, the profile generating apparatus 100 receives setting of the combination ratio α on the combination ratio setting screen illustrated in FIG. 5, and combines the transmissive color measurement value 502 and the reflective color measurement value 522 (S110 to S112). Then, the profile generating apparatus 100 generates the profile 400 using the combination color measurement value 550, generates the color conversion table 450 illustrated in FIG. 6 (S114 to S116), finishes the color conversion table generating process.

As described above, since the reflective color measurement value 520 is estimated from the transmissive color measurement value 500, the profile 400 can be generated even when a color measuring equipment measuring the patch PA1 is not included in a case in which light is reflected from the front surface PA1a of the patch PA1. Accordingly, in this specific example, convenience can be improved.

Also, a method of estimating the reflective color measurement value 520 from the transmissive color measurement value 500 is not limited to the method described above, and various methods for obtaining the correlations can be adopted. In addition, even in this specific example, the intermediate profiles 401 and 402 may be generated on the basis of the color measurement values 500 and 520, and the final profile 400 may be generated by combining the intermediate profiles 401 and 402 at the combination ratio α.

6. Modification Example

In the invention, various modification examples are conceivable.

For example, the output device is not limited to an ink jet printer, and an electrophotographic printer such as a laser printer, a three-dimensional printer, and the like may be used.

A color material for forming an image on a medium includes ink, toners, and the like.

The types of color materials for forming an image on a medium are not limited to CMYK, in addition to the CMYK, there are Lc (light cyan) having a lower concentration than C, Lm (light magenta) having a lower concentration than M, Dy (dark yellow), Or (orange), and Gr (green) having a higher concentration than Y, Lk (light black) having a lower concentration than K, a colorless material for improving image quality, and the like. In addition, even when a color material of a part of the CMYK is not used, this technique can be applied thereto.

The input color space is not limited to an RGB color space, and may be a CMY color space, a CMYK color space, and the like.

The processes described above can be appropriately modified such as switching the sequences. For example, in the color conversion table generating process of FIGS. 2 and 8, the process of S110 of receiving the setting of the combination ratio α can be executed before any process of S102, S104, S106, and S108. The process of S106 of acquiring the transmissive color measurement value 500 and the process of S108 of acquiring the reflective color measurement value 520 can be also switched.

7. Conclusion

As described above, according to the invention, a technique which is capable of improving color reproduction characteristics of the image on the medium depending on a circumstance of illumination being used, or the like can be provided according to various aspects. Of course, the basic action and effects described above can be obtained even in a technique configured with only a configuration condition according to independent claims.

In addition, a configuration in which each configuration disclosed in the examples described above is mutually replaced with each other or the combination is changed, and a configuration in which each configuration disclosed in a known technique and in the examples described above is mutually replaced with each other or the combination is changed, and the like can be also implemented. The invention also includes these configurations, and the like.

This application claims priority under 35 U.S.C. § 119 to Japanese Patent Application No. 2016-165377, filed Aug. 26, 2016. The entire disclosure of Japanese Patent Application No. 2016-165377 is hereby incorporated herein by reference.

What is claimed is:

1. A profile generating apparatus which generates a profile in which color reproduction characteristics of an image formed on a medium are regulated, the apparatus comprising:
    a processor that includes
        a transmissive color measurement value acquiring portion that acquires a transmissive color measurement value which is a color measurement value of a patch in a case in which light is transmitted to the medium on which the patch is formed;
        a reflective color measurement value acquiring portion that acquires a reflective color measurement value which is a color measurement value of the patch in a case in which light is reflected from a front surface of the patch; and
        a profile generating portion that generates the profile based on the transmissive color measurement value and the reflective color measurement value, the profile generating portion including
            a first intermediate profile generating portion that generates a first intermediate profile in which color reproduction characteristics in a case in which light is transmitted to the medium of the image to be formed on the medium are regulated based on the transmissive color measurement value, the first intermediate profile regulating a correspondence relation between a coordinate value of the transmissive color measurement value in color space and a value indicating amount of ink used,
            a second intermediate profile generating portion that generates a second intermediate profile in which the color reproduction characteristics in a case in which light is reflected from a front surface of the image to be formed on the medium are regulated based on the reflective color measurement value, the second intermediate profile regulating a correspondence relation between a coordinate value of the reflective color measurement value in color space and a value indicating amount of ink used, and
            a profile combining portion that generates the profile by combining the first intermediate profile and the second intermediate profile.

2. The profile generating apparatus according to claim 1, wherein the profile generating portion includes a combination ratio setting portion that receives setting of the combination ratio of the transmissive color measurement value and the reflective color measurement value, and
    wherein the profile combining portion combines the first intermediate profile and the second intermediate profile so that the transmissive color measurement value and the reflective color measurement value are combined together at the combination ratio.

3. A profile generating apparatus which generates a profile in which color reproduction characteristics of an image formed on a medium are regulated, the apparatus comprising:
    a processor that includes
        a transmissive color measurement value acquiring portion that acquires a transmissive color measurement value which is a color measurement value of a patch in a case in which light is transmitted to the medium on which the patch is formed;
        a reflective color measurement value acquiring portion that acquires a reflective color measurement value which is a color measurement value of the patch in a case in which light is reflected from a front surface of the patch; and
        a profile generating portion that generates the profile based on the transmissive color measurement value and the reflective color measurement value,
    the reflective color measurement value acquiring portion acquiring the reflective color measurement value being estimated from the transmissive color measurement value according to a correspondence relation between the transmissive color measurement value and the reflective color measurement value which are determined in advance, and
    the correspondence relation being set so that a reflectance corresponding to the reflective color measurement value is smaller than a transmittance corresponding to the transmissive color measurement value, in a case in which the transmissive color measurement value is a color measurement value greater than a predetermined transmittance.

4. The profile generating apparatus according to claim 3, wherein the profile generating portion includes further a color measurement value combining portion which generates the combination color measurement value in which the transmissive color measurement value and the reflective color measurement value are combined, and generates the profile based on the combination color measurement value.

5. The profile generating apparatus according to claim 4, wherein the profile generating portion further includes a combination ratio setting portion which receives setting of a combination ratio of the transmissive color measurement value and the reflective color measurement value, and wherein the color measurement value combining portion generates the combination color measurement value in which the transmissive color measurement value and the reflective color measurement value are combined together at the combination ratio.

6. A profile generating method of generating a profile in which color reproduction characteristics of an image formed on a medium are regulated, the method comprising:

acquiring a transmissive color measurement value which is a color measurement value of a patch in a case in which light is transmitted to the medium on which the patch is formed;

acquiring a reflective color measurement value which is a color measurement value of the patch in a case in which light is reflected from a front surface of the patch; and generating the profile based on the transmissive color measurement value and the reflective color measurement value, the generating of the profile including generating a first intermediate profile in which color reproduction characteristics in a case in which light is transmitted to the medium of the image to be formed on the medium are regulated based on the transmissive color measurement value, the first intermediate profile regulating a correspondence relation between a coordinate value of the transmissive color measurement value in color space and a value indicating amount of ink used, generating a second intermediate profile in which the color reproduction characteristics in a case in which light is reflected from a front surface of the image to be formed on the medium are regulated based on the reflective color measurement value, the second intermediate profile regulating a correspondence relation between a coordinate value of the reflective color measurement value in color space and a value indicating amount of ink used, and generating the profile by combining the first intermediate profile and the second intermediate profile.

7. A profile generating method of generating a profile in which color reproduction characteristics of an image formed on a medium are regulated, the method comprising:

acquiring a transmissive color measurement value which is a color measurement value of the patch in a case in which light is transmitted to the medium on which the patch is formed;

acquiring a reflective color measurement value which is a color measurement value of a patch in a case in which light is reflected from a front surface of the patch; and generating the profile based on the transmissive color measurement value and the reflective color measurement value, in the acquiring of the reflective color measurement value, the reflective color measurement value being estimated from the transmissive color measurement value being acquired, according to a correspondence relation between the transmissive color measurement value and the reflective color measurement value which are determined in advance, and the correspondence relation being set so that a reflectance corresponding to the reflective color measurement value is smaller than a transmittance corresponding to the transmissive color measurement value, in a case in which the transmissive color measurement value is a color measurement value greater than a predetermined transmittance.

\* \* \* \* \*